J. H. MYERS.
VOTING MACHINE.
APPLICATION FILED NOV. 4, 1895.

972,565.

Patented Oct. 11, 1910.
10 SHEETS—SHEET 1.

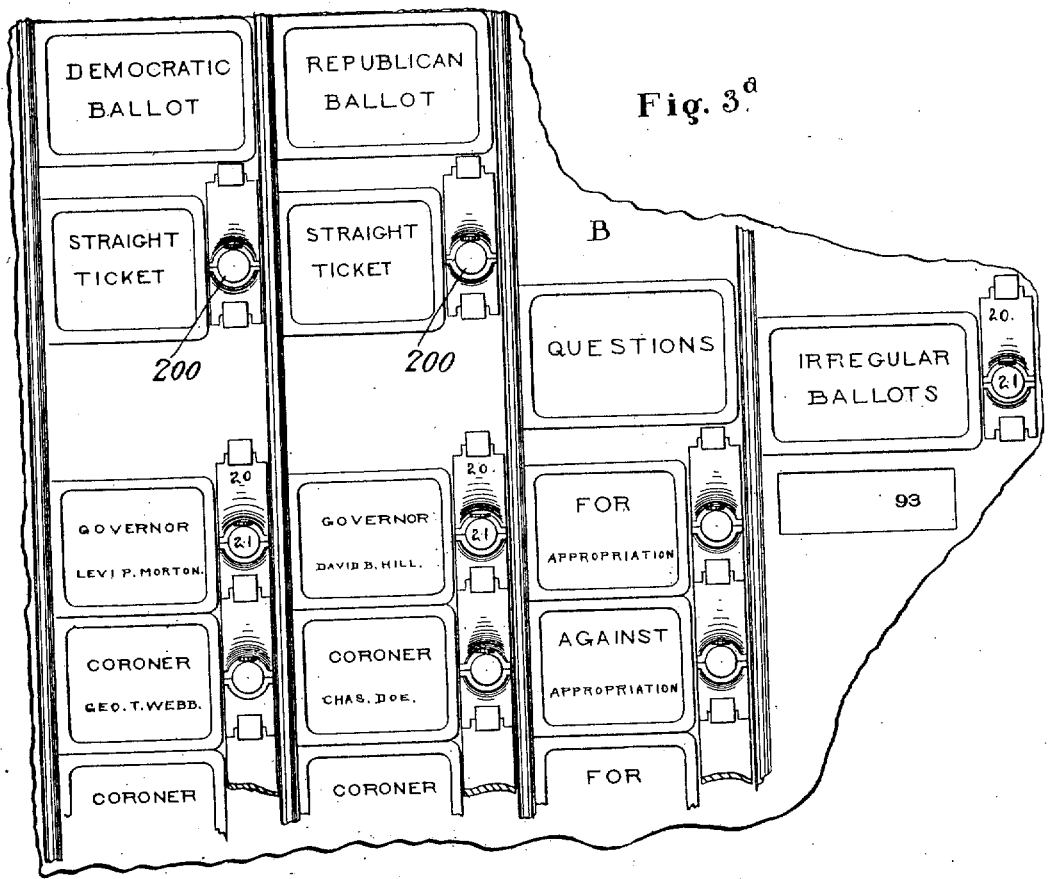

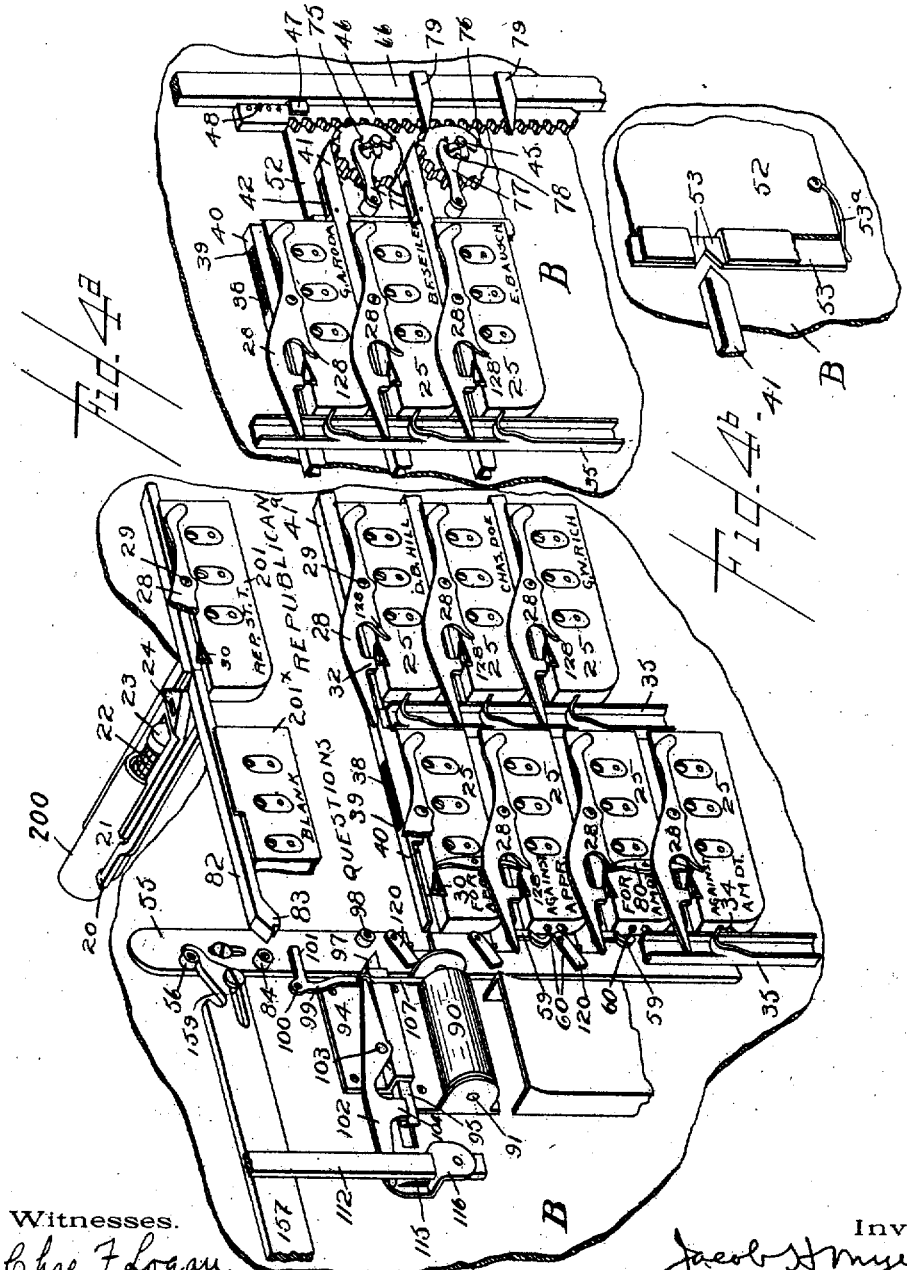

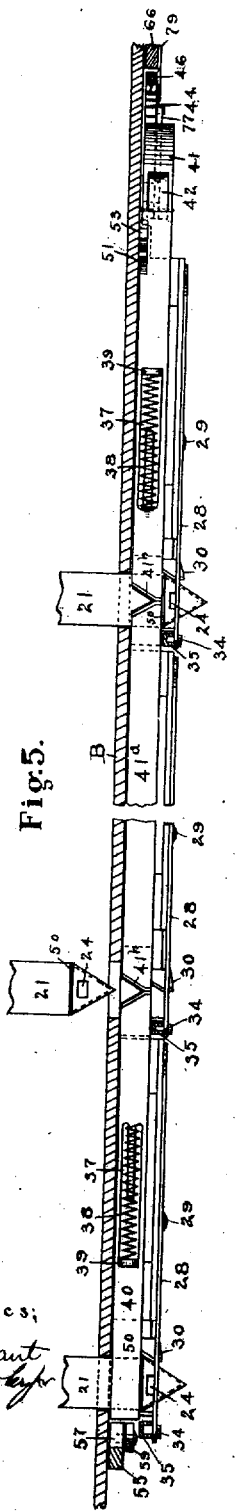
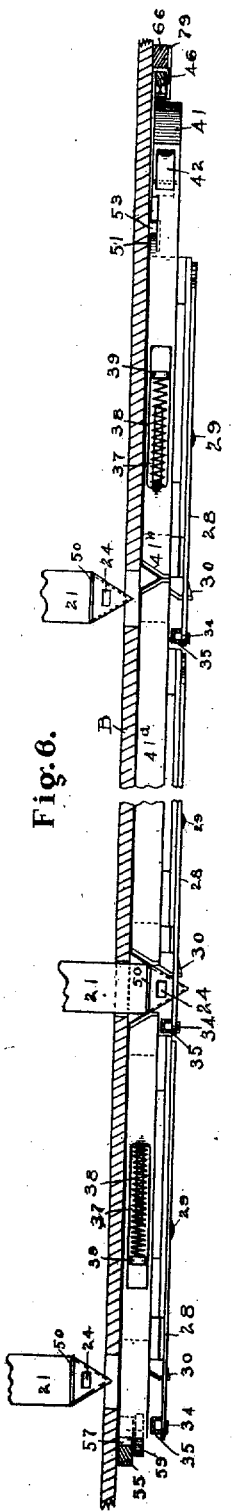

J. H. MYERS.
VOTING MACHINE.
APPLICATION FILED NOV. 4, 1895.

972,565.

Patented Oct. 11, 1910.
10 SHEETS—SHEET 6.

Witnesses:

Inventor:
Jacob H. Myers
his Atty's

J. H. MYERS.
VOTING MACHINE.
APPLICATION FILED NOV. 4, 1895.
972,565.
Patented Oct. 11, 1910.
10 SHEETS—SHEET 7.
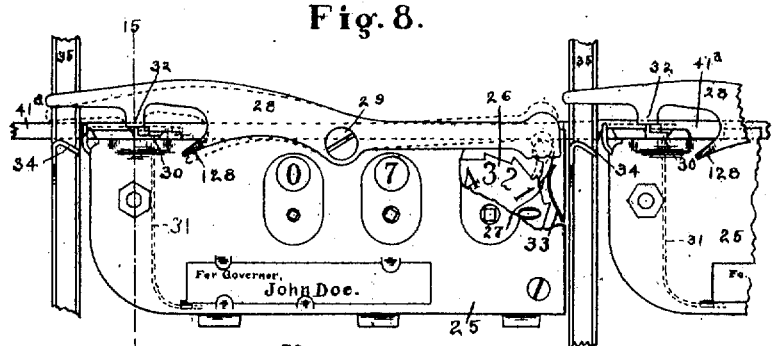
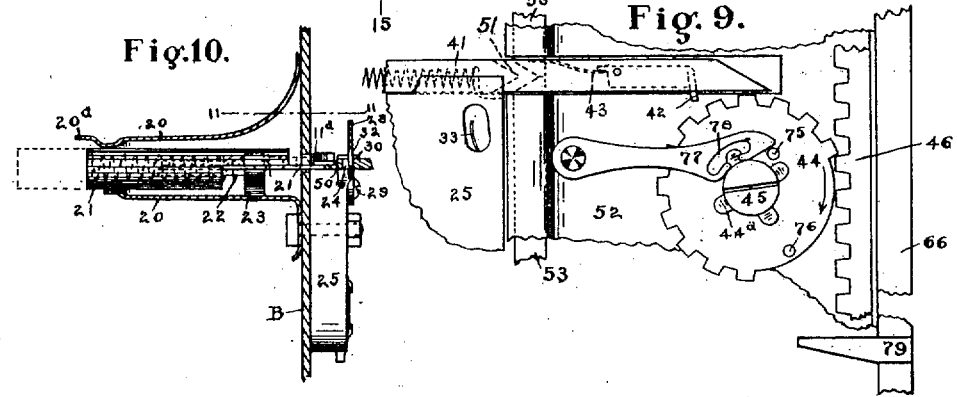
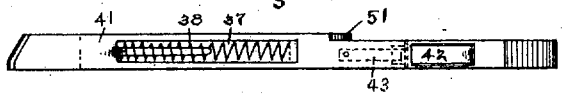
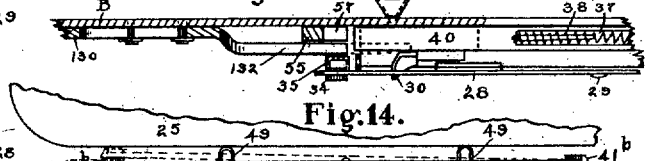
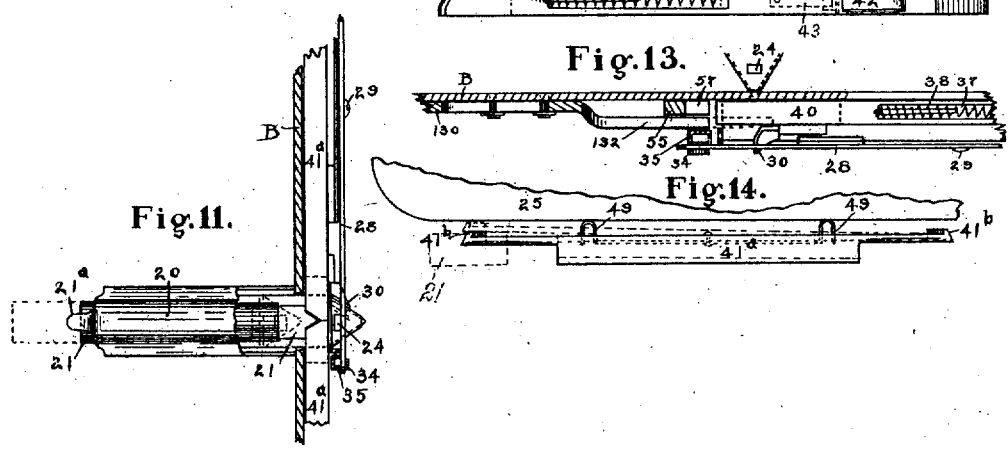

J. H. MYERS.
VOTING MACHINE.
APPLICATION FILED NOV. 4, 1895.
No. 972,565.
Patented Oct. 11, 1910.
10 SHEETS—SHEET 8.
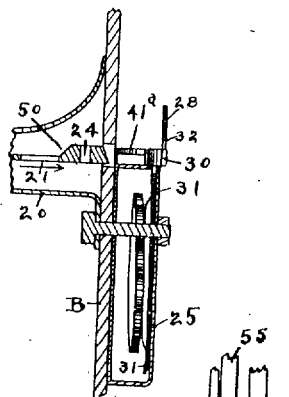
Fig. 15.
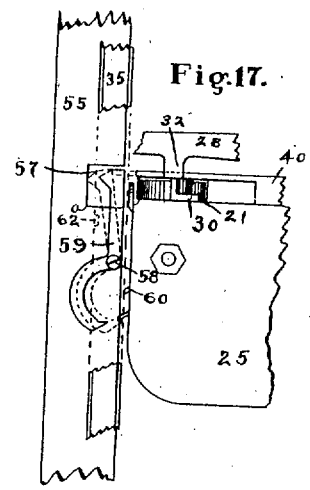
Fig. 16.  Fig. 17.
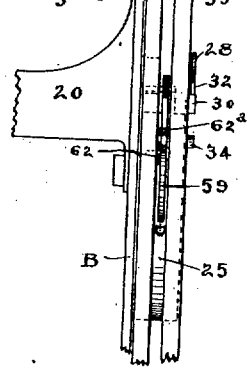
Fig. 18.
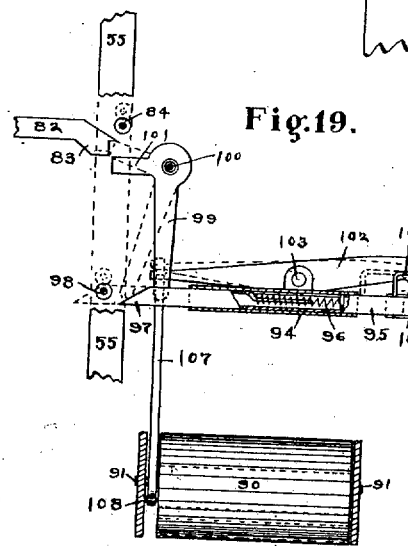
Fig. 19.
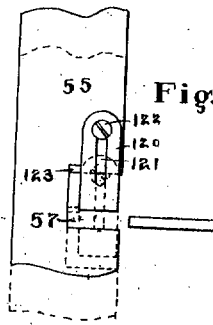
Fig. 22.
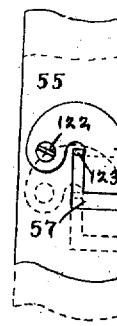
Fig. 23.
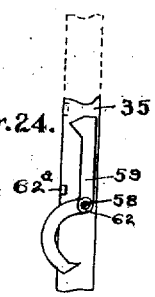
Fig. 24.
Witnesses:
Inventor,
Jacob H. Myers,
his atty's.

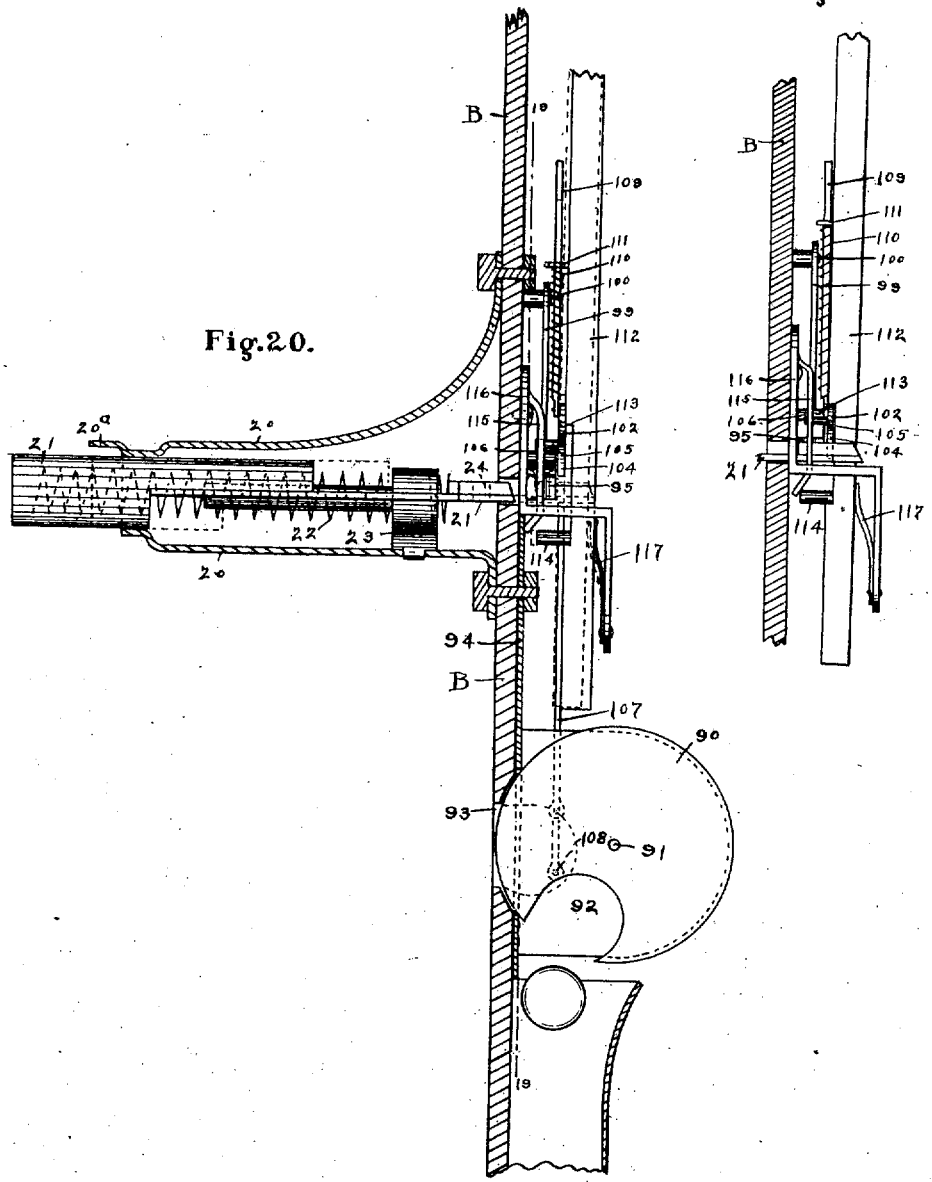

J. H. MYERS.
VOTING MACHINE.
APPLICATION FILED NOV. 4, 1895.

972,565.

Patented Oct. 11, 1910.
10 SHEETS—SHEET 10.

Witnesses.
Walter B. Payne
J. M. Fowler Jr.

Inventor.
Jacob H. Myers
by Church & Church
his Attorneys

UNITED STATES PATENT OFFICE.

JACOB H. MYERS, OF ROCHESTER, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

972,565.   Specification of Letters Patent.   Patented Oct. 11, 1910.

Application filed November 4, 1895. Serial No. 567,965.

*To all whom it may concern:*

Be it known that I, JACOB H. MYERS, of Rochester, in the county of Monroe and State of New York, have invented certain new and useful Improvements in Voting-Machines; and I do hereby declare the following to be a full, clear, and exact description of the same, reference being had to the accompanying drawings, forming a part of this specification, and to the reference letters and numerals marked thereon.

My present invention relates to improvements in voting machines particularly of the class contained in my prior Patents Nos. 415,549, 424,332 and 494,588, and has for its objects to improve the construction and operation of some of the operative parts, whereby they are greatly simplified and rendered positive in their operation, and whereby also the capabilities of the machine are increased, and to these and other ends the invention consists in improvements and combinations of parts, all as will be hereinafter fully described and the novel features pointed out particularly in the claims at the end of this specification.

Figure 1:
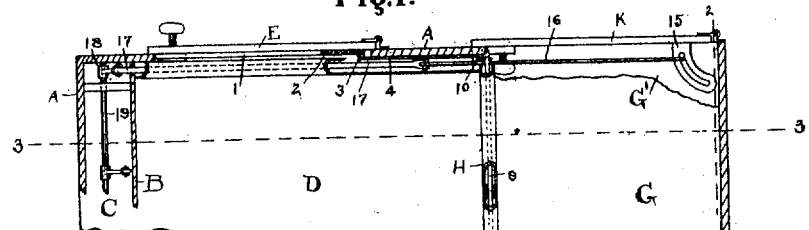
Figure 2:
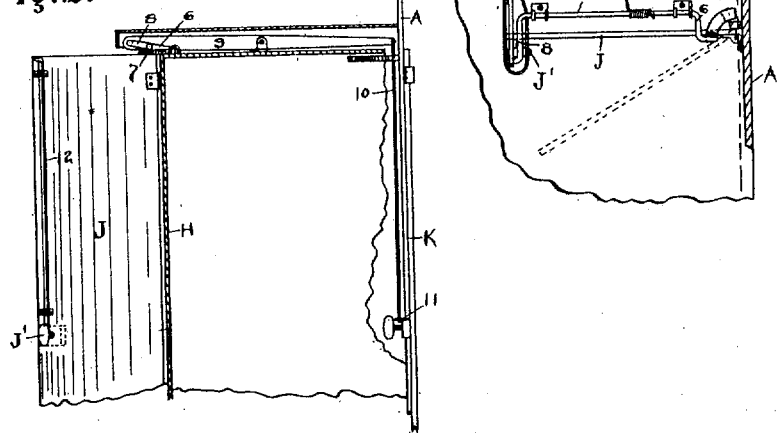
Figure 3:
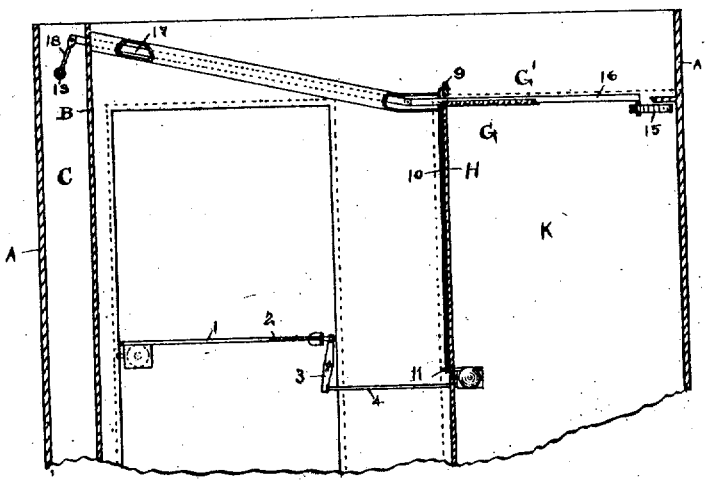
Figure 4:
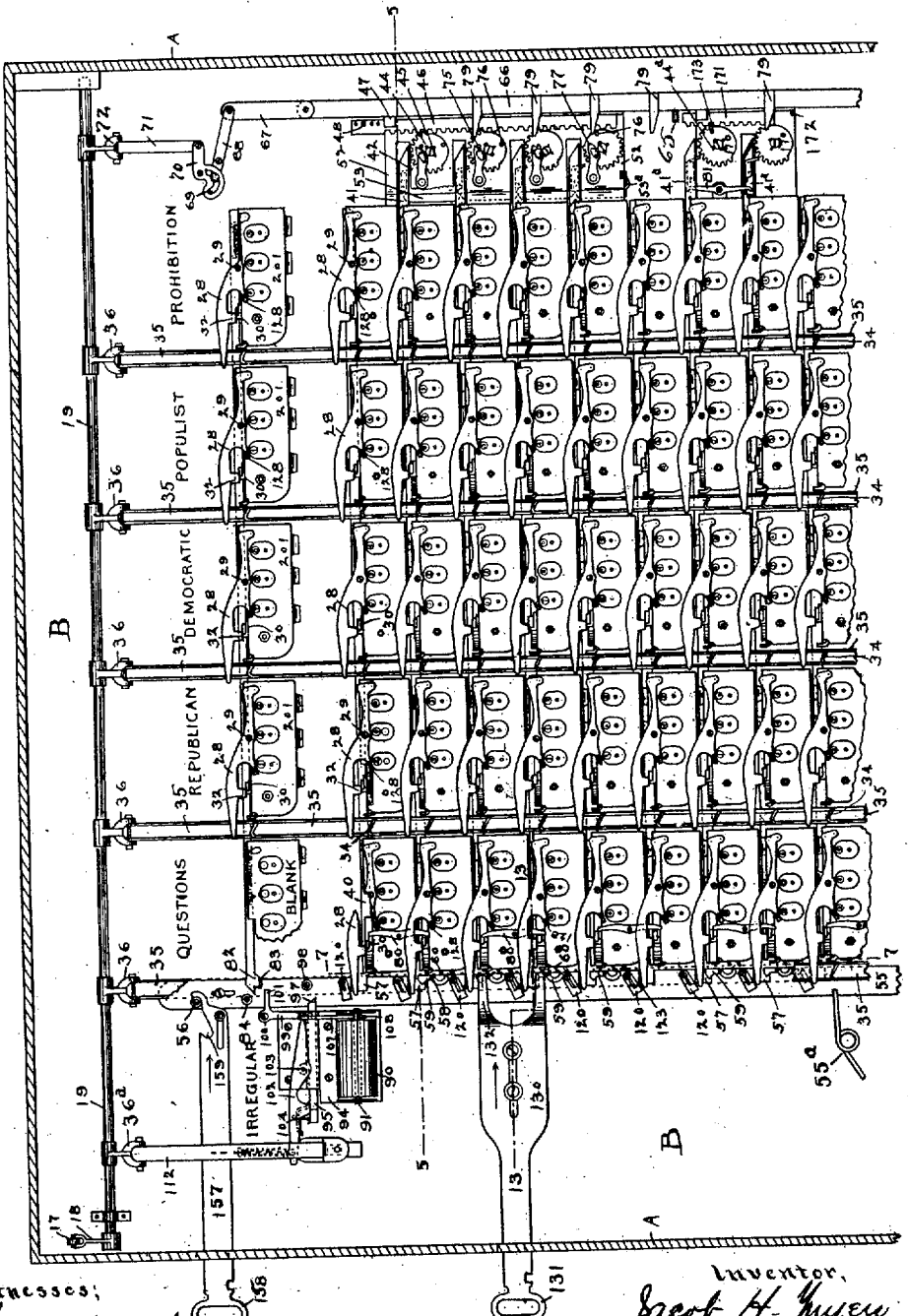
Figure 21:
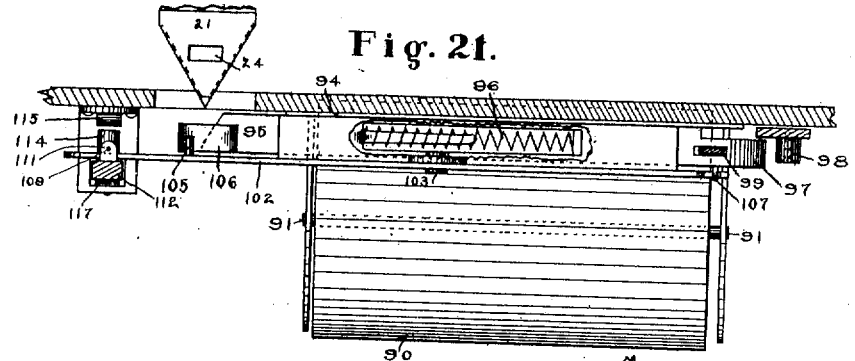
Figure 7:
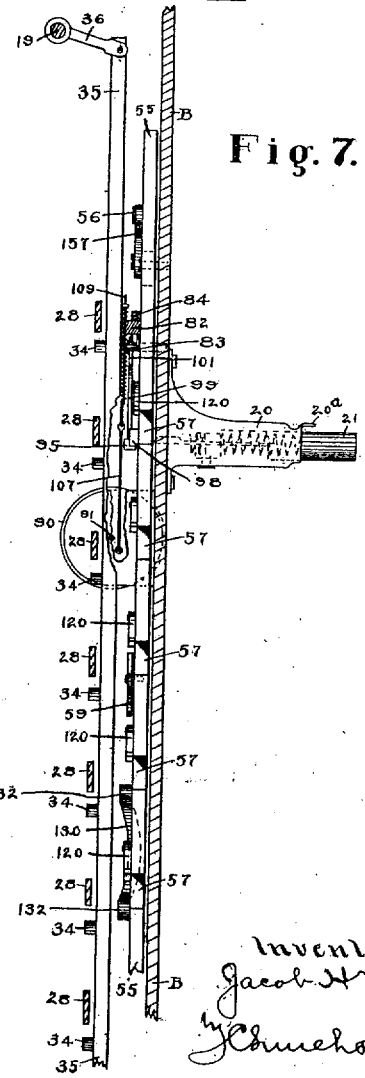
Figure 25:
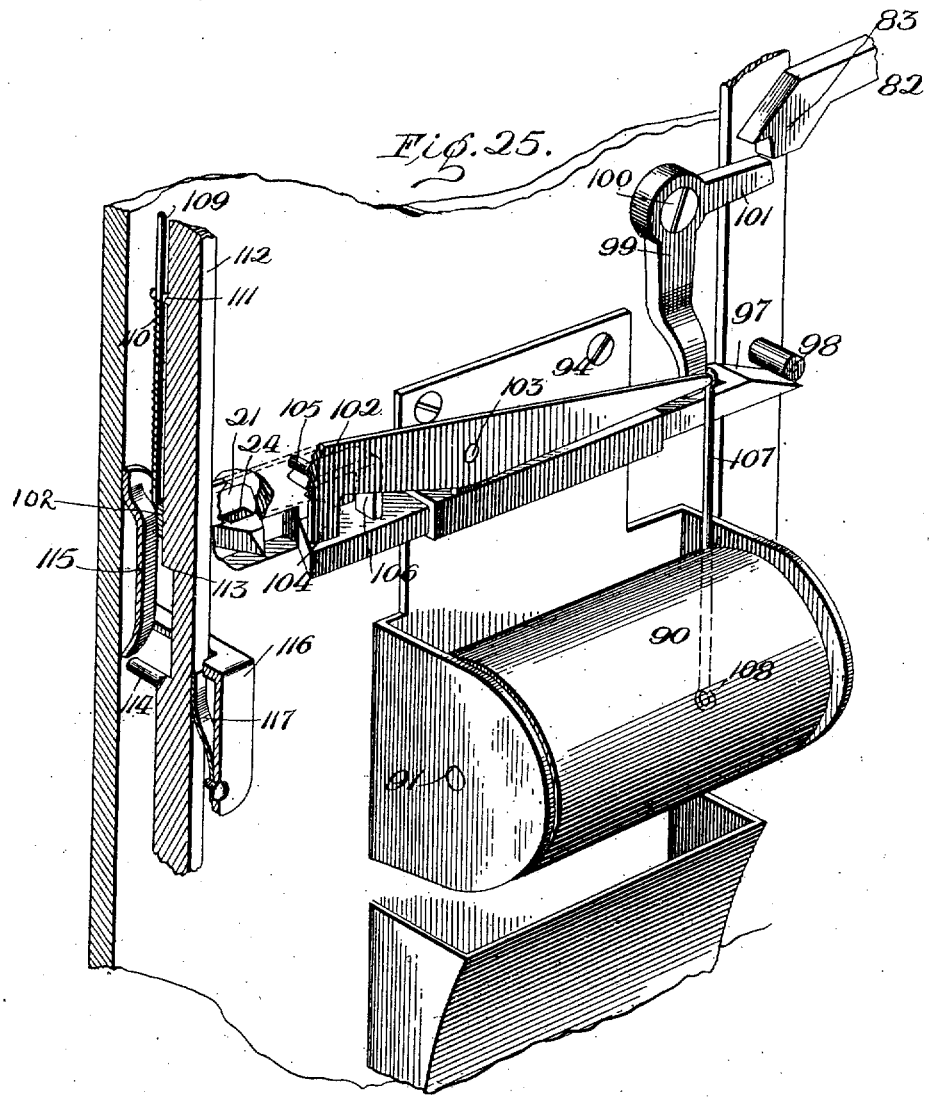
Figure 7A:
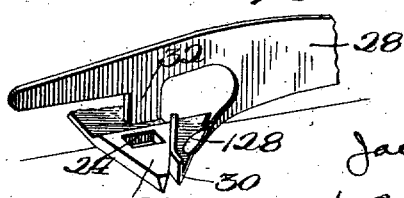

In the accompanying drawings: Figure 1 is a plan view of a portion of the booth or cabinet. Fig. 2, a sectional view on the line 2—2 of Fig. 1 looking to the left. Fig. 3, a sectional view on the line 3—3 of Fig. 1. Fig. 3ª, a front view of a portion of the plate or partition carrying the ballot-indicating devices. Fig. 4, a rear view of the same. Fig. 4ª is a perspective view of the rear of the supporting plate, similar to Fig. 4, showing the operating parts of the machine, the central part of the plate being broken away and showing only the end counters. Fig. 4ᵇ is a perspective view partly in section, looking toward the rear of the supporting plate B and showing the interlocking devices between the horizontal rows of blocks in the multicandidate group. Fig. 5, a horizontal-sectional view on the line 5—5 of Fig. 4, showing one of the row of ballot-indicating keys operated. Fig. 6, a similar view during the operation of one of the keys. Fig. 7, a vertical-sectional view on the line 7—7 of Fig. 4. Fig. 7ª a perspective view of the counter-actuating lever. Fig. 8, a detail rear view partly in section of one of the counters and the actuating and releasing devices. Fig. 9, an enlarged elevation of one of the operating devices of the multi-candidate group. Fig. 10, a sectional view of one of the push-keys in the multi-candidate group after it has been actuated. Fig. 11, a sectional view of the same on the line 11—11 of Fig. 10. Fig. 12, a detached plan view of the end block of the multi-candidate group. Fig. 13, a section on the line 13—13 of Fig. 4. Fig. 14, a detached view of one of the sliding blocks of the multi-candidate group. Fig. 15, a vertical-sectional view on the line 15—15 of Fig. 8. Figs. 16 and 17 are enlarged detail views of devices for the locking out of the "straight ticket" mechanisms. Fig. 18, an end view of the same. Fig. 19, a section taken on the line 19—19 of Fig. 20. Fig. 20, a vertical-sectional view of the irregular voting device. Fig. 20ª, a similar view with the key or indicator moved inward. Fig. 21, a plan view of the same with the push-key-casing removed. Fig. 22, a detail view. Fig. 23, a modification of the detail in Fig. 22. Fig. 24, a view of one of the catches for holding the movable member 55, taken from the side opposite to that shown in Fig. 17. Fig. 25 is a sectional perspective view of the irregular voting device.

Similar reference letters and numerals in the figures indicate similar parts.

The booth or casing for containing the operating parts of the machine is essentially the same in construction as shown in my prior patents before referred to, and embodies a main casing A preferably constructed of metal of suitable thickness formed in sections and adapted to be bolted together and capable of being readily taken down and being stored or being set up in a room where the election is to be held. Extending across the inside of the chamber thus formed is a partition or wall B dividing the booth into two chambers or compartments, the one C containing the counting and operating mechanism, accessible only to the judges and inspectors of election, and the other compartment D being accessible to the voter through the usual entrance door E. Inside the booth is a compartment G formed by a partition H and an interior door J, the exit door K from the booth opening from this compartment G. Suitable interlocking devices are provided between the doors E and K embodying the sliding-bar 1, the spring 2 for operating it, the lever 3, and the sliding-bar 4, such as shown in my Patent No. 494,588, the arrangement of these parts being such that the entrance door E cannot be opened until the door K has closed and released the voting mechanism, and suitable interlocking devices are arranged between the doors J and K so that the latter cannot be opened until the former has been closed. These devices may be of any suitable construction, but I prefer to employ a suitable rock-shaft 5 journaled in bearings arranged above the partition or plate G' forming the top of the chamber G; said rock-shaft having at one end an arm 6 adapted to be actuated by a cam-plate 7 on the door J and at the other end of said rock-shaft is an arm 8 pivoted to the end of a pivoted lever 9 to which is connected a vertically operating bolt 10 coöperating with a suitably perforated projection 11 secured to the door K. A vertically moving bar 12 is arranged in suitable bearings on the door J and adapted to be actuated by the knob J', its upper end projecting in proximity to the arm 8, the construction of the parts being such that when the knob J' is actuated to unlock the door J, the rod 12 will move the rock-shaft 5 through the arm 8, and through the lever 9 and rod 10, will lock the outer door K and as said door J is opened, the cam 7 operating on the arm 6 will hold the outer door locked until the voter enters the apartment G and then as the door J closes the outer door K will be released and the voter, now in the compartment G, may pass out of the outer door K. Upon the latter is arranged a slotted cam 15 in the slot of which operates the end of a sliding-bar 16 pivoted to a link 17 connected to a crank-arm 18 on the rock-shaft 19 located in the compartment C, which causes the return of the parts of the voting apparatus to normal position.

As in the machine shown in my former patents, the devices accessible to and operated by the voter consist of a series of push-keys, or ballot indicators, which are preferably arranged upon the face of the partition B in substantially the manner shown in my prior patents and in Fig. 3ᵃ herein, the pushes or keys devoted to candidates for the same office being preferably arranged in the same horizontal plane, while those devoted to the candidates of the same party are arranged one beneath the other in columns, vertically, suitable designating devices, such as previously described by me, may be used to indicate the columns of the candidates of the various parties and preferably one of the columns is devoted to questions upon which a popular vote is desired, such as constitutional amendments, appropriations for specific purposes, and in Fig. 4 of the drawings I have arranged a series of such counters or ballot indicators in the column to the extreme left. I have also shown in said figure a series of counters located slightly above the others arranged in party columns, the operation of these counters indicating a vote for all of the candidates or nominees of the party in whose column they are located, as shown particularly in Fig. 3ᵃ, where the pushes are denominated by the words "straight ticket." Sometimes it is desirable that devices be provided for enabling voters to cast a ballot for candidates not regularly nominated by the parties to whom a column of counters has been devoted, and in my present machine I provide for this, the indicating devices being designated by the words "irregular ballots" in Fig. 3ᵃ.

The ballot push keys employed in the present machine resemble somewhat those shown in my prior patents and embody a key-casing 20 preferably formed of sheet metal secured to the partition plate B by bolts or otherwise, and the keys proper consist of a barrel 21 having a flat inner portion moved outward or retracted by means of a spring 22 operating against an abutment 23, the inner end of the key being beveled on opposite sides, as shown in Figs. 10, 11 and 15, and provided with an aperture 24 with which the key-retaining devices coöperate, as presently described. The counter-casing is also provided with a lug or projection 20ᵃ at its end and the knob or end of the key is, when pressed in, beneath this lug, the object being to prevent an unruly voter from striking the push with his fist and tending to damage the machine, as unless his hand or thumb is below the lug it will be brought in violent contact with the end thereof, as will be understood. Each of the counters upon the rear side of the partition B excepting in the first column at the left and those in the upper row is devoted to a separate candidate, and as before, the operation of this counter one unit causes the registering of a vote for the candidate to whom it is devoted, and all of the counters are constructed in substantially the same manner, the difference between them and their actuating devices, as well, residing principally in the interlocking mechanism, presently described. As before, each counter embodies a suitable casing 25 within which is arranged a train of counting wheels, the numbers on which are visible through apertures in the counter-casing, and the first or unit wheel 26 of the train is provided on its periphery with ratchet-teeth with which coöperates a pawl 27 mounted upon the end of a counter-actuator in the form of a lever 28 pivoted at 29 to some suitable support, such as the casing.

Upon the upper portion of the counter casing, for the purpose of arresting the downward movement of the left end of the actuator 28, is a small arresting slide 30, having a beveled face, guided by suitable ears on the casing and operated in one direction by a light spring 31, as shown in Figs. 8 and 15; said spring moving the slide toward the left in Fig. 8 to support the key-retainer, and the end of the lever 28 is provided with a downwardly extending projection 32, which, when the key is not operated, rests upon the top of the slide 30, but when the push key is thrust in, its beveled end moves the slide laterally and allows the projection 32, which constitutes a key-retainer, to drop into the aperture 24 and hold the key, preventing its withdrawal until operated upon by the releasing devices. The parts are so arranged that when the key-retainer is resting upon the block 30, the pawl 27 is not in such engagement with the tooth of the unit wheel of a counter that a downward movement of the pawl will actuate the ratchet wheel, but when the key retainer drops into the aperture of the key after the latter has been pushed in, the actuator 28 will then move to the position shown in dotted lines in Fig. 8, and the pawl 27 being operated upon by the spring 33 will engage said tooth, so that when the outer end of the actuator 28 is moved upwardly by the releasing devices, the counter will be operated to indicate one unit or vote for the candidate to whom it is devoted; the result of this being that when a voter actuates a ballot-push-key the counter is not operated directly, as in my before-mentioned patent, but is set, so that one vote is counted for each of the candidates whose push keys have been operated by the voter, only when he leaves the booth or the proximity of the push keys; by this means preventing a repeated or fraudulent operation of the counter, a voter only setting the device for counting one vote, and this only after the key has been retained against the tension of its spring.

The extreme end of the actuator 28 projects beyond the counter-casing and in position to be operated upon by a lug or ear 34, a series of which lugs are formed upon each of the releasing rods 35 attached to arms 36 on the rock shaft 19. These rods 35 are preferably formed of sheet metal bent up into trough-shape and having the ears 34 formed integral therewith. The bars or rods 35 are connected to move simultaneously and constitute in effect a frame which is movable edgewise of the bars, as distinguished from a movement toward and from the front plate, and these bars or rods therefore constitute a means for actuating the pawls which are left in voted position.

It will be noted that the operation of counting is only accomplished when the voter leaves the booth by the key-releasing mechanism, and in order that the fraudulent operation of the machine may not be accomplished by fastening in one of the push-keys and thereby enabling a vote to be registered for the candidate to whom it is devoted, every time the exit door is opened, I form each of the actuators 28 which are made of elastic sheet material, such as steel with a downwardly and preferably outwardly extending ear 128, see Fig. 7ª which, when the key is properly operated and the arresting slide 30 moves forwardly in line with the key opening, is inoperative, but if through accident or design the slide should be prevented from moving back over the key aperture in the partition B to its normal position, when the lever 28 is lifted by the lifting rod or rods 35, the said end 128 will engage the end of the slide, the curve thereof causing it to spring outward and as the lever is moved upward will rise above the top of the slide and rest upon it when it descends as shown in Fig. 7ª, so that this counter actuator 28 will be thrown out of operation entirely and its counter will not be operated again until the slide 30 is moved forward to normal position after the push key has returned to its normal position. It will be noted that when the bars 35 move upwardly to raise the actuators and release the keys they are operated sufficiently high to move all the actuators whether allowed to drop by the keys or not, thus insuring the release of the keys and releasing any actuators which may have been caught on the interlocking blocks as described.

The interlocking devices between the counters in the horizontal rows devoted to candidates for the same office, excepting those in the multi-candidate group, consist of sliding blocks having the beveled proximate ends and actuated toward the center by springs, substantially as shown in my previous patents, the end blocks in the present instance however, being provided with slots 37 and tongues, which latter are encircled by spring 38 resting against projections 39 formed upon the tops of the counter-casings, as shown in Figs. 5 and 6, but as the first row of counters to the left of Fig. 4 are those devoted to questions, and not to individual candidates or parties, the last block 40 of each of the series, both of the multicandidate group and the others, extends over the "questions" counter, with its end normally projecting beyond the latter and over the key of the counter in the "questions" column, as shown in Fig. 4.

The multi-candidate group of counters and operating keys are to be used when there are two or more candidates nominated by each party, and the voter is entitled to vote for as many candidates as there are offices to be filled, that is to say, if, as shown in the drawing, there are four candidates nominated by each party for the office of coroner, the voter may be permitted to vote for any four of them, and no more, this feature being contained in my prior Patent No. 494,588. In order that this may be accomplished in the present machine I construct the last of the sliding blocks 41 in each horizontal line of the multi-candidate group, as shown in Figs. 5, 6, 9, and 12, said block being provided with the springs 38 operating the blocks toward the center in the manner described as shown in Fig. 7ª, and arranged upon this is a pawl 42 the operating end of which is pressed downward by a spring 43 in such position that when any key in the line is pushed in and the end blocks 41 are moved to the right, said pawl will engage with a tooth of a movable member in the form of a gear 44 pivoted upon a stud 45 and turn said gear the space of one tooth in the direction indicated by the arrow in Fig. 9. This gear 44 of each row of counters in the multi-candidate group meshes with a vertically movable rack-bar 46 operating in suitable guides 47 and having at its upper end the removable screw or pin 48 adapted to contact with the upper guide 47 and limit the downward motion of said rack after the operation of one, two, three or four keys in the multicandidate group, depending upon its adjustment. The intermediate blocks 41ª in the multi-candidate group are constructed as shown in Fig. 14 preferably of sheet metal, the lower sides and ends being cut away as shown in said figure, and being slightly beveled downward and outward, as shown at 41ᵇ, and are each also provided with a spring having the upwardly extending portions 49 adapted to engage with the underside of the counter-casings directly over them, as shown in Figs. 10 and 14, thereby holding the blocks down with a yielding pressure, though not interfering to any appreciable extent to their sliding laterally when the push keys are inserted between them. The inner pointed ends of all of the push keys in the multi-candidate group are of about the thickness or height of the sliding blocks, but a short distance back of the ends they are reduced in thickness to a trifle less than the cut-out spaces in the blocks 41ª, the rear side of the raised portion being inclined as shown in Figs. 10 and 15 at 50, and the relation of the thickened portion of the key to the width of the blocks and the location of the key-retainer is such, that, when one key in the multicandidate group is being pressed in, as shown in Fig. 6, the blocks will be moved so as to prevent the simultaneous operation of any other key in that horizontal line, but after the key has been fully moved in, as shown in Fig. 5 to the right, the thickened head of the key will pass beyond the ends of the sliding blocks, which are then permitted to come together, back of said head after the operated key has been retained by the key-retainer. Thus, as shown in Fig. 5, the key to the right has been operated and there is nothing to prevent the next key in the same line being operated also. When the keys in the multi-candidate group are released from the retainers, the inclined portions 50 on the keys operated will lift the ends of the blocks 41ª against the tension of the springs 49 thereon and permit the outward movement of the keys. In order to prevent the simultaneous operation of two keys in different horizontal rows I provide upon one, preferably the last sliding block 41 of each row, a pointed projection 51 and arrange between a plate 52 and the front plate or partition B, a vertically movable series of sliding blocks 53, see Fig. 4 which, when in normal position occupy the position shown in dotted lines in Fig. 4 and Fig. 9, being held in contact by gravity, and the series being supported upon a light spring 53ª, but when the key in one row is operated, the inclined portion 51 will separate the blocks 53 and prevent the simultaneous operation of any key in the other rows, as will be understood, and as the blocks in the horizontal rows are adapted to return to normal position after the actuation of any of the keys, the successive operation of keys in the same or different rows will not be interfered with.

It will now be understood that the operation of any key in the multi-candidate group will, through the pawl 42 and gear 44 operate the sliding rack-bar 46 downward, one unit or space, and when the required number of votes have been cast in this group, as predetermined by the adjustment of the adjustable screw or stop 48, said screw will engage the guide 47 and by preventing further movement of the rack-bar prevent the movement of any of the horizontal sliding blocks far enough to allow the retainer on the counter lever to drop into the aperture and thereby set the counter and retain the key.

The rack-bar 46 operated by the sliding-blocks on the counters in the multi-candidate group is returned to normal position by a stud 65 on a vertically sliding rod or bar 66 connected by a link 67 with a lever 68, the end of which operates in a cam slot 69 in a lever 70 pivoted to the partition B and connected by a link 71 with an arm 72 on the rock-shaft 19, see Fig. 4 this construction permitting a considerable movement of the rod 66 by a comparatively small movement of the rock-shaft.

While the multi-candidate group of ballot-indicating devices is primarily adapted for voting for any desired number of candidates, as the machine is adapted for general elections, it is desirable that means be provided for using these rows of counters for single candidates, and in order that this may be accomplished I arrange upon the gears 44, pins 75 and 76, (Fig. 9) the former being adapted to coöperate with the recess 78 in the pawl 77 when it is desired that only one vote be permitted for a candidate in the line of sliding blocks controlled by this gear, and when this is to be done, the pin 75 is placed in the recess 78, as shown at the bottom of the multi-candidate group and to the right in Fig. 4. In the event that the gear is out of mesh with the rack (and it may here be stated that the gears are mutilated gears for this purpose) so that when the sliding blocks have been moved once by the push key, the pawl 77 will prevent further movement of the gear and consequently the lateral movement of the blocks necessary to permit the inward movement and retention of a second push-key. Of course the other gears of the multicandidate group could be similarly arranged if desired and in order that when so arranged they may be returned to first position by the rocking of the shaft 19 I provide upon the sliding rod 66 suitable arms 79, as shown in Figs. 4 and 9 adapted to coöperate with the pins 76 to return the gears to normal position, that is, as shown in the lowermost gear of the multicandidate group. Under ordinary circumstances these arms 79 do not engage the pin 76, but only when the multicandidate group is not to be used as such, but only to permit a vote for one candidate in the row. The gears 44 and the rock-bar are held in whatever position they may be moved by the operating parts by means of spring washers 44ª arranged between the heads of their pivot pins and the gears as shown Fig. 9.

As before stated, when the keys are operated, a vote for the particular candidate to which the key is devoted is indicated, but not counted until the voter leaves the proximity of the keys. As this machine is arranged to indicate a vote for the straight party ticket and also for candidates not nominated, there must be some form of locking-out mechanism between the multicandidate group, the group for individual candidates for the same office, the irregular candidate ballot, and the straight party ballot, so that when any one of these is operated it is impossible that an irregular ballot or party ballot can be cast by the same individual, and for this purpose I arrange in suitable guides at the left of the machine a movable member in the shape of a plate 55 adapted to be moved vertically, the normal downward motion being limited by a small roller or pin 56 resting in a notch in the end of a slide 157, as shown in Fig. 4, said plate 55 having a series of recesses 57 arranged normally in line with the end block of the horizontal sliding series of each line of counters, and pivoted upon pins 58 on this bar are a series of catches 59, one for each horizontal line of counters and blocks in the multi-candidate group, the upper ends of said catches projecting into the recesses 57 opposite the end sliding blocks of the horizontal rows of multi-candidate group, while their lower ends are hooked as shown in Figs. 16 and 17, and are adapted to engage with suitable stationary lugs or stops 60 (in the present instance formed on the end of the counter-casings in the "questions" column). Beneath these catches and between the heads of the pins 58 on which they are pivoted and the plate 55 are elastic or spring washers 62, which serve to hold the catches in either of the positions shown in full or dotted lines in Figs. 16 and 17. For the present, it need only be stated that the operation of one of the keys denoting a vote for a straight party ticket or for the deposit of an irregular ballot, requires the vertical movement of the plate 55 so that if by the operation of any one of the keys in the multicandidate group this plate is locked from upward movement, the other mechanisms mentioned will be prevented from operation. The movable member or plate 55 is comparatively light, but I preferably provide a light spring 55ª (Fig. 4) to partially counterbalance it and permit its easy operation. When one of the keys in the multi-candidate group is operated, the end block 40 will move over to the position in dotted lines in Fig. 16 causing the end of the catch 59 to engage with the projection 60, the friction washer retaining it in this position and preventing the movement of the plate 55 by the other mechanisms. The release of this catch (and the return of the plate to normal position so far as this catch is concerned) is caused by the pin 62ª on the rear side of the end vertically movable releasing rod 35, which engages said catch above its pivot and turns it to normal position, as shown in full lines in Fig. 24. This member or plate 55 is locked when any of the separate candidate ballot-indicating devices other than these in the multi-candidate group are actuated, by causing said end block to pass into the slot or recess 57, which is opposite the row, and as the sliding blocks in this row are maintained separated when the key is retained in the manner described herein and in my other patents, the end block will prevent its upward movement.

It will be understood that for the sake of clearness I have broken away the key-releasing and counter-actuating rod 35 of the "questions" column in Fig. 4 to show more clearly the construction and operation of the plate 55, but, as will be seen from an inspection of Figs. 7 and 18, the rod 35 is outside, while the plate 55 is close against and slides upon the partition B. The slides 30 of each pair of counters in the "questions"

column are arranged to coöperate with levers 80 see Fig. 4 to prevent the operation of one after its corresponding one has been actuated, substantially as shown in my prior Patent No. 424,332, and therefore this does not need further description.

In case there are two candidates nominated by each party and a voter is permitted to vote for any two of them and no more, instead of employing precisely the means shown in the multi-candidate group for locking out this portion of the machine after a predetermined number of candidates have been voted for, I employ such an arrangement as is shown at the lower portion of Fig. 4, to the right. In this, the sliding blocks, counter-actuators, key-retainers, etc., are constructed precisely as in the multi-candidate group, and the last blocks toward the right of the series are provided with spring pawls operating upon mutilated gear-wheels 170, which are adapted to mesh with a short rack 171, the downward motion of which is limited by a stationary stop or lug 172 and one of the mutilated gears, preferably the upper, is provided with a pin 173 adapted to be engaged by one of the arms 79, on the sliding re-setting or releasing-rod 66. In this instance the total movement of the rack 171 is such as will be caused by the operation of two of the push-keys in either row, and, instead of employing the vertically sliding blocks 53 between these two lines of mechanisms, I employ a pivoted lever 81 engaging with suitable slots or recesses in the end blocks 41ª, as shown. By means of this construction, if one of the push-keys in the upper row of a pair be operated, the gear 170 will be rotated a corresponding distance, and the rack-bar 171 moved down and so also if a push-key in the lower row is operated the rack-bar will be moved down a corresponding distance, and then being arrested by the stop 172, these parts will be locked from further operation. If, however, attempt is made to press in one key in each row simultaneously, the lever 81 will prevent the simultaneous operation of the rows of sliding blocks in the same way as the similar lever between the counters in the "questions" column, although either one of the push keys can be operated separately, the interlocking devices between the end sliding blocks to the left and the movable plate 55 are precisely the same as those described with reference to the interlocking devices of the multicandidate group and therefore need no further specific description.

In order that a "straight" party ballot may be cast or indicated by a voter, by which is meant a vote for all the candidates nominated by a particular party and whose names appear on counters and opposite push keys in each party column, I provide at the head of each party column a push key or knob 200, and arrange back of it a counter 201, in all respects similar to those heretofore described. The sliding blocks between these push keys are of the ordinary construction having beveled proximate ends and arranged as in my prior patents so that when a key in the line is inserted, the entrance of other keys will be prevented and the end block 82 (to the left of Fig. 4) is provided with a beveled outer end, as shown and a projection 83 on the lower side. In the present construction I have shown a blank counter-casing 201ˣ supporting this end block, and the block as somewhat lengthened, but this is only necessary in the present machine, because of the location of the "questions" column at the end of the series, and it will be understood that any suitable guide for this block may be employed. Arranged upon the plate 55 is a small stud or friction roller 84 so located that when one of the push-keys 200 in the top row is operated and the block 82 is moved laterally, the beveled end engaging under the roller 84 will raise the plate 55 until the recesses 57 therein are above the sliding blocks of all of the counters on the plate B, thereby preventing the indication of a vote for any other candidate whether for the same or a different party from the party whose key in the top row has been operated and as this block is retained in this position until the voter leaves the proximity of the keys, and he is prevented from returning, he can only move the one key and everything else is locked until he passes out the exit door, when the lifting rod 35 will be moved vertically counting one vote for each of the party candidates on the counter 201, and returning the machine to normal position, the plate 55 moving downward by gravity or a spring if desired. This operation of the plate 55 has also locked out the irregular voting device, which will now be described, and which is shown particularly in Figs. 4, 19, 20 and 21. In carrying out this portion of my invention it is my object to provide a device operated by a key which will lock the whole machine and permit the introduction of a suitable written or printed ballot contained in a case, preferably in the form of a cylindrical tube closed at both ends which tube will be deposited into the receptacle as the voter leaves the booth, the machine being released or returned to operative position at the same time.

In the present embodiment of my invention I provide a rotary receiver in the shape of a cylinder 90 pivoted on centers 91 and having a receptacle or recess 92 in one side, as shown particularly in Fig. 20, which receiver is normally in the position shown in full lines, the cylindrical portion closing the aperture 93 formed in the plate B, but when the key controlling this receiver is operated, the latter will be turned to the position shown in dotted lines so that a ballot contained in a tubular casing may be inserted therein and retained in sight with all the mechanism locked until the voter leaves the booth when the receiver 90 will be turned to the position in full lines, and the cylindrical tube containing the ballot will be dropped into a suitable receptacle. The key for controlling this device is substantially the same as all of the others, being provided with the pointed end and the aperture 24 near it. Mounted in a suitable guide on the plate 94, which supports this device on the partition B is a slide 95 operated by a spring 96 so that its beveled end will project in position to be operated upon by the corresponding beveled end of the key, as shown in Fig. 21, and the rear end of this block is also beveled at 97, as shown in Fig. 19, and is adapted when the key is pushed in and said slide is moved to the position in dotted lines in said figure, to engage with a roller or stud 98 arranged upon the plate 55 so that when the key of the irregular balloting device is operated, the plate 55 will be raised and all of the counters excepting the "straight" ticket balloting devices locked out thereby, but this block 95 is also slotted and in said slot operates the end of an arm 99 of a bell-crank lever pivoted at 100, the other arm 101 of said lever being arranged, when the slide is operated, to project in the position shown in dotted lines in Fig. 19 and in the path of the lug or projection 83 on the end slide 82 of the "straight" ticket counters, whereby this will be locked and prevented from operation as well. The key retainer in this irregular voting device consists of a lever 102 pivoted at 103 to a suitable bracket and having the depending arm or ear 104 adapted to engage the aperture 24 in the key, and it is further provided with the pin 105, which, when the key is out or retracted by its spring, is supported upon an arm or projection 106 on the top of the sliding block 95, and said lever 102 is connected by a link 107 with a crank pin 108 on the rotary receiver 90, so that when the lever or key retainer 102 is permited to move down by the lateral movement of the block 95 to the position in dotted lines in Fig. 19, the recess 92 in the holder 90 will come opposite the aperture 93 in the partition B; at the same time the key will be retained by the ear 104 in the same manner as the keys operating the counters. Instead of permitting the lever 102 to drop by gravity alone, I pivot to its outer end a sliding pin 109 encircled by a spring 110 arranged between the end of the lever and an eye 111 upon the lifting rod 112, which is connected by an arm 36ª with the rock-shaft 19 (see Figs. 4, 19 and 20) and this rod 112 is provided with a shoulder 113 adapted to engage the upper side of the lever 102, as will be explained. Secured to the inner side of the rod 112 is a stud or pin 114 adapted to coöperate, when the rod is lifted, with the underside of the lever 102 to disengage it from the aperture in the key and the said stud also coöperates with a cam surface formed by a tongue 115 forming a part of a plate 116 which latter is provided with an aperture for the passage of the rod 112 and also with a downward extension to which is connected a small leaf spring, the function of which is to press the rod 112 inward to the position shown in dotted lines in Fig. 20, when the lever 102 is dropped and engages the key.

In normal position the parts are as shown in Figs. 20 and 21 and when a voter wishes to deposit a ballot for one or more candidates not regularly nominated by one of the parties, he presses inward the knob 21 of the push key causing the lateral movement of the slide 95, and the movement of the plate 55 locking out the other voting apparatus. This operation also permitting the retaining end 104 of the lever 102 to drop into engagement with the aperture in the key, and the spring 117 forces the rod 112 forward to the position in dotted lines so that the shoulder 113 will be over the end of the lever 102. This operation has turned the ballot receiver 90 up to the position shown in dotted lines in Fig. 20 in which position it is locked by the shoulder 113 and the voter then places his prepared ballot contained in a suitable tube or receptacle within the recess 92 in the receiver 90 and then leaves the booth, passing out through the doors, as described. When the rock-shaft 10 is tilted, the rod 112 is raised, the projection 114 sliding up on the tongue 115, moving the rod backward and releasing the shoulder 113 from the lever 102, the continued upward movement lifts the end of the lever 102, permits the key to be forced outward again by its spring, and allows the lateral movement of the slide 95 until the ear 106 thereon passes beneath the pin 105, the parts being then returned to normal position, and as the end of the lever is moved upward by the pin 114, the receiver 90 is rotated to the position in full lines in Fig. 20 and the tube containing the prepared ballot is deposited in a suitable receptacle provided for the purpose.

As machines of this general description are adapted for general election purposes, it may be desirable in some instances to permit voters, not possessing the qualifications of the general run of voters, to vote for candidates for specified offices, such, for instance, as school commissioners, and in order that such persons may have access to the booths and vote for such designated officers and none others, I provide upon the sliding locking bar or plate 55, a number of small stop plates 120 having slots 121 through which pass the pins 122 and upon the plate are arranged lugs 123, which may, when the machine is in general use, support said stop pieces in the position shown in full lines in Fig. 4, but said stop pieces are generally turned to the position shown in full lines in Fig. 22 to close the recesses 57 excepting a small portion, sufficient for the entrance of the end sliding-blocks of the horizontal rows of counters. Those stop pieces 120 opposite the row of counters devoted to candidates for an office for which the voter is competent to cast a ballot are turned to the position shown in full lines in Fig. 4, so that the recesses 57 in these lines are not partially blocked. Before such voter possessing limited qualifications enters the booth, the attendant in charge moves the slide 157 inward by means of a handle 158, permitting the plate 55 to move downward until the roller 56 is in the bottom of the slot or recess 159 and this will bring the stop blocks 120 opposite the sliding blocks in the lines of candidates for which she is not qualified to vote and prevent the operation of any push-keys in this line, so that the voter may then press the push-keys of any of the candidates for which she is qualified to vote and none others, and when she leaves the booth, the votes thus indicated will be counted. This downward movement of the plate 55 locks out the "straight" ticket voting devices as the roller 84 will be substantially in line with the end of the block extension 82, and will prevent its movement far enough to permit the indication of a vote, and will also lock out the irregular voting devices as the roller 98 will be substantially in line with the end of the block 95.

Instead of making the stop plates 120 of the form shown in Fig. 4, they could be made as in Fig. 23 being pivoted directly to the plate 55 and capable of being turned to the positions shown in full and dotted lines in said figures, as will be understood. It is also sometimes desirable to prevent certain voters from voting on questions of appropriations, for instance, and in Figs. 4 and 13 I have shown a slide 130 having a handle 131 capable of being operated from the exterior of the booth; said plate 130 having tongues 132, which are adapted to project in line with the push keys of two or more of the counters in the "questions" column, the position of the parts, when it is desired to cut out two or more of these counters and the slide is pushed in, being indicated by dotted lines in said Fig. 13.

It will be understood that as far as the operation of the interlocking mechanisms is concerned, it is immaterial whether the particular form of counter shown is employed or not, as the counters could be actuated by the slides 30, as shown in my other patents, or otherwise.

The movable member or plate 55 having the recesses 57 and movable stops 120 thereon, in connection with a means for readily operating it, as the slide 157, is a valuable feature in a machine of this description, irrespective of its connection with the "straight" ticket or irregular voting devices, and also the interlocking devices of the series of individual indicators, for it enables the machine to be adapted by a single operation for enabling voters with limited qualifications to vote for certain candidates and none others. If, for instance, there should only be one vertical series of counters, say the second from the left hand in Fig. 4, and consequently no interlocking devices between the indicators now devoted to candidates for the same office, it will be seen that the member 55 and the stops thereon could be utilized to permit only certain candidates in this column to be voted for by arranging the stops 120 properly and dropping the member 55, the sliding blocks to the left then coöperating with the stops or slots as the case might be, the keys or indicating devices in this second column in this event being considered a series within the meaning of the terms of my claims directed to this feature.

While I have termed the interlocking devices between the indicators devoted to candidates for the same office "sliding blocks," I wish this to apply as well to such devices as rollers, or other movable parts, the function of which is to prevent the operation of more than a predetermined number of indicators.

The counter actuators are normally out of operative contact with the counters only in the sense that the movement of said actuator by the voter, does not cause the operation of the counter to register, but simply sets the parts or puts them into such coöperative relation that the return of the actuator to first or normal position moves the counter or registering mechanism one unit so that the whole of the counting or registering operation is caused automatically by the operation of the door or barrier.

The complete cycle of operation of the machine will be understood to mean the operations which take place from the entrance of the voter into the booth (or his approaching the ballot board or support) to his exit from the booth, or his departure from the proximity of the balloting devices whether these operations are caused by the movements of doors, barriers, or movable parts operated directly by the voter or by officers in charge of the election. The locking, interlocking and registering mechanisms prevent the operation of a counter or register more than once during a complete cycle of operation of the machine.

I claim as my invention:

1. In a voting machine, the combination with a series of separately and manually operated straight ticket ballot indicators, one for all the candidates of a party, and interlocking devices between the individual indicators of the series, a series of separately and manually operated indicators, one for each individual candidate, interlocking devices between the indicators devoted to candidates for the same office for preventing the operation of more than a predetermined number, all of the indicators being accessible to the voter, a plurality of counters, one for each ballot indicator, and counter actuators normally out of operative connection and arranged to be connected by the operation of the indicator, of means for positively and simultaneously operating all the counters whose indicators have been operated by the voter, and a locking-out mechanism arranged between the straight ticket indicators and the individual candidate indicators, whereby the operation of one in either series will lock all those in the other.

2. In a voting machine, the combination with a series of separately and manually operated straight ticket ballot indicators, one for all the candidates of a party, and interlocking devices between the individual indicators of the series for preventing the operation of more than one, a series of separately and manually operated ballot indicators, one for each individual candidate, and interlocking devices between the indicators devoted to candidates for the same office for preventing the operation of more than a predetermined number, all of said indicators being directly accessible to the voter, a plurality of counters, one for each ballot indicator, and counter actuators normally out of operative connection, and arranged to be connected by the operation of the indicator, of means for positively and simultaneously operating all of the counters whose indicators have been actuated by the voter, and a locking-out mechanism controlled by the interlocking devices between the straight ticket indicators and also by the interlocking devices between the individual candidate indicators, whereby the operation of a straight ticket ballot indicator will lock all the individual candidate indicators, and vice versa.

3. In a voting machine, the combination with a series of straight ticket ballot indicators, one for all the candidates of a party, interlocking devices between the indicators for preventing the operation of more than one, an irregular ballot indicator, a series of individual candidate ballot indicators, and interlocking devices between them for preventing the operation of more than a predetermined number, a plurality of counters, one for each straight ticket and individual candidate indicator, counter actuators normally out of operative connection and arranged to be connected by the operation of the indicators, of a locking-out mechanism controlling the operation of the straight ticket indicators, the irregular indicator, and the individual candidate indicators, whereby upon the operation of either the straight ticket, irregular, or any of the individual indicators, the other two will be locked from operation, and means for simultaneously and positively operating all of the counters, whose indicators have been operated.

4. In a voting machine, the combination with a series of straight ticket ballot indicators, one for all of the candidates of a party, and interlocking devices between the indicators of the series for preventing the operation of more than one, an irregular ballot indicator, and a lid or cover controlled thereby, a series of ballot indicators, one for each individual candidate, and interlocking devices between the indicators devoted to candidates for the same office for preventing the operation of more than a predetermined number, a plurality of counters, one for each straight ticket and individual candidate indicator, counter actuators normally out of operative connection and arranged to be connected by the operation of the indicators, of a locking out mechanism controlled by the interlocking devices between the straight ticket indicators, the irregular ballot indicator, and the interlocking devices between the individual candidate indicators, whereby upon the operation of any of the straight ticket indicators, the irregular indicator, or any of the individual candidate indicators, the other two will be locked from operation, and means for positively and simultaneously actuating all of the counters, whose indicators have been operated.

5. In a voting machine, the combination with a series of straight ticket ballot indicators, one for all the candidates of each party, interlocking devices between them, and retainers for the indicators, of a series of ballot indicators, one for each candidate, retainers for the indicators, interlocking devices between the indicators for candidates for the same office, counters for the indicators in both the straight ticket and individual candidate series, counter actuators normally out of operative connection but arranged to be connected by the operation of the indicators, means for positively and simultaneously operating all of the counters whose indicators have been operated, a movable member actuated by the interlocking devices of the straight ticket indicators and controlling and controlled by the interlocking devices of the individual candidate indicators.

6. In a voting machine, the combination with a series of ballot indicators, as keys, interlocking devices, as movable blocks, between them, and retainers for the indicators, of a series of ballot indicators, as keys, retainers for the indicators and interlocking devices between the indicators for preventing the operation of more than a predetermined number, a movable member having recesses therein with which the last-mentioned interlocking devices coöperate, and connections between said member and the first-mentioned interlocking devices, whereby said member will be actuated by the operation of any of the first-mentioned series of indicators, substantially as described.

7. In a voting machine, the combination with a series of ballot indicators, as keys, interlocking devices between them and retainers for the indicators, of two or more series of ballot indicators, as keys, and interlocking devices between the indicators of each series to prevent the operation of more than a predetermined number, a movable member actuated by the operation of any indicator on the first mentioned series and controlled by the interlocking devices of any of the last mentioned series, a series of adjustable stops on the movable member with which the said interlocking devices may engage at certain times, and devices for giving said movable member an abnormal movement to bring the stops in position to engage the interlocking devices and prevent the operation of any indicator controlled by them, substantially as described.

8. In a voting machine, the combination with two or more series of groups of ballot indicators, as keys, interlocking devices for each series between the indicators thereof for preventing the operation of more than a predetermined number and retainers for the indicators, of a movable member having a series of adjustable stops thereon, one for each series of indicators, but normally out of line therewith, and devices for operating said member to bring the stops in position to be engaged by the interlocking devices of a series of indicators, substantially as described.

9. In a voting machine, the combination with a series of ballot indicators, as keys, of a movable member having a series of adjustable stops thereon, and a series of movable parts, as slides, actuated by the indicators and arranged to contact with the stops on the movable member when the latter is moved in one direction, substantially as described.

10. In a voting machine, the combination with a series of "straight ticket" ballot indicators, interlocking devices between said indicators, and a movable block having the incline and operated by any of the indicators, an irregular ballot indicator and a movable block actuated thereby having an incline, of the movable member having studs thereon with which the inclines on the said blocks coöperate, and the lever located between the movable blocks for preventing the operation of one after the other has been actuated, substantially as described.

11. In a voting machine, the combination with the series of "straight ticket" ballot indicators, interlocking devices between the indicators of the series, and the slide having the incline thereon, the irregular ballot indicator, the ballot receiver controlled thereby, the slide actuated by the indicator having the incline, and the lever coöperating with the slides and preventing the operation of one when the other is actuated, of the movable plate having the studs and the recesses, and two or more series of ballot indicators, interlocking devices between the members of each series and the movable blocks operated by the indicators of the series coöperating with the recesses in the movable member, substantially as described.

12. In a voting machine, the combination with a plurality of series of ballot indicators, a counter for each key, a series of movable blocks between the indicators of each series for preventing the simultaneous operation of more than one indicator in the series, a pawl carried by one of the blocks in each series, and a toothed movable member, as a gear, for each series, of interlocking devices between the blocks of the different series, connections between the movable toothed members, and a stop for arresting the movement of said members after a predetermined number of indicators have been actuated, substantially as described.

13. In a voting machine, the combination with a series of ballot keys automatically operated in one direction, having projections thereon and the inclines at the rear of the projections, of a series of blocks arranged between the keys movable laterally to permit the passage between them of the projections on but a single key at a time and independently movable vertically to permit the movement of the keys in one direction, a series of key retainers one for each key, releasing devices for the retainers, a progressively movable member actuated intermittingly by the lateral movement of the blocks, and a stop for arresting it after a predetermined number of keys have been operated, substantially as described.

14. In a voting machine, the combination with a plurality of series of ballot keys, each key independently and automatically movable to normal position and having the projection and the incline at the rear of the projection, of a series of blocks for each series of keys, and arranged between the keys thereof, movable laterally to permit the passage between them of the projection on but a single key and independently movable vertically to permit the movement of the keys in one direction, a key retainer for each key, releasing devices for the retainers, a progressively movable member, a stop for limiting its movement after a predetermined number of operations, and connections between each series of sliding blocks and said member, and a resetting device for the member, substantially as described.

15. In a voting machine, the combination with a series of ballot indicators, and a movable member actuated by any of the ballot indicators in the series, of a series of ballot indicators, interlocking devices between them for preventing the simultaneous operation of more than one, but permitting their successive operation, and a catch such as 59 for engaging and holding the movable member operated by any of the indicators in the last-mentioned series, substantially as described.

16. In a voting machine, the combination with a ballot indicator and a movable member such as 55 actuated thereby, of a series of ballot indicating keys having projections thereon, sliding blocks between them and springs for operating said blocks, locking devices for locking the blocks after the operation of a predetermined number of keys, and a catch such as 59 for engaging and holding the movable member after the actuation of any key in the series, substantially as described.

17. In a voting machine, the combination with a movable ballot indicator, of a counter, a counter actuator normally out of operative connection with the counter and adapted to be placed into coöperative relation therewith by the movement of the indicator but incapable of being directly moved to operate the counter and means for operating the counter only one number and causing the positive return of the actuator to original position during a complete cycle of operation of the machine.

18. In a voting machine, the combination with a movable ballot indicator, and a retainer therefor, of a counter, a counter actuator normally out of connection with the counter, connections between the indicator and actuator for placing the latter in operative connection with the counter when the indicator is operated, and devices for moving the actuator to operate the counter and release the indicator, substantially as described.

19. In a voting machine, the combination with a movable ballot key, of a counter, a counter actuator normally out of operative connection with the counter, another key retainer on the actuator for holding the key when operated, connections between the key and actuator for connecting the latter with the counter, and a releasing device for moving the counter-actuator to register one vote on the counter and release the key, substantially as described.

20. In a voting machine, the combination with a movable ballot key, of a counter, a counter-actuator normally out of operative connection with the counter, a key retainer, connections between the key and actuator for connecting the latter with the counter, a releasing device for moving the actuator and releasing the key and a barrier, as a door, controlling access to the key and operating the releasing device, substantially as described.

21. In a voting machine, the combination with a series of movable ballot keys and interlocking devices between them for preventing the operation of more than a predetermined number, a series of counters, counter-actuators normally out of operative connection with the counters, having key retainers thereon, supports for the actuators adapted to be engaged by the keys and releasing devices for operating the actuators and releasing the keys, substantially as described.

22. In a voting machine, the combination with a ballot indicating key, of a counter having a ratchet wheel, the counter actuator carrying the pawl, and having the projection for engaging the key and devices for operating the actuator to move the wheel and release the key, substantially as described.

23. In a voting machine, the combination with a ballot indicating key, of the counter and the elastic counter actuating arm normally out of operative connection with the counter having the projection for coöperating with the key and the curved tongue beneath, and the slide operated by the key between the tongue and projection, substantially as described.

24. In a voting machine, the combination with a ballot indicating key having an aperture, and a counter, of an elastic counter actuator normally out of operative connection with the counter, having the projection for engaging the aperture on the key and retaining the latter, and the curved tongue beneath, and devices for operating the actuator, releasing the key, and moving the counter, substantially as described.

25. In a voting machine, the combination with a booth or chamber and an exit door or barrier, a plurality of series of ballot indicators forming a part of the permanent structure, and interlocking devices between the indicators of each series to prevent the operation of more than a predetermined number, of a series of counters, one for each indicator, a series of counter actuators forming a part of the permanent structure normally out of operative contact with their counters, operating devices controlled by the ballot indicators for operatively connecting the actuators with their counters, and connections between the door or barrier and the counter actuators for moving all of the latter simultaneously, in a direction to actuate the counters substantially as described.

26. In a voting machine, the combination with a booth or chamber, a plurality of series of ballot indicators forming a part of the permanent structure, and interlocking devices between the indicators of each series to prevent the operation of more than a predetermined number, of a series of counters one for each indicator, a series of counter-actuators forming a part of the permanent structure normally out of contact with their counters, operating devices controlled by the ballot indicators for operatively connecting the actuators with their counters, and connections between all of the actuators for causing their simultaneous operation in a direction to actuate the counters, substantially as described.

27. The combination with the key casing having the lug or projection at the outer end, of the ballot indicating key normally extending beyond the key casing and adapted to be moved inward with its end back of the lug, a spring for holding the key out, and a counter rendered operative when the key is pressed inward against the spring, substantially as described.

28. The combination with a ballot indicating key, and the movable member 55, having the catch 59, of a series of keys having the beveled ends and projections thereon, the sliding blocks and springs for operating them, the gear actuated by the blocks and a stop for arresting it, and the lug 60 engaged by the catch, substantially as described.

29. In a voting machine, the combination with the booth or chamber and balloting devices accessible from the interior thereof, the exit door K, the securing bolt 10 therefor and connections between the door and the balloting devices, of the inside door J having the cam 7, the rock-shaft 5 having the arm 6 coöperating with the cam and the arm 8, and the lever 9 connected to the securing bolt 10 of the door K, substantially as described.

30. The combination with a series of ballot indicating keys, the movable blocks between them, and the end block of the series having the pawl 42 thereon, of the gear 44 having the projection 75, and the catch 77 having the recess 78.

31. The combination with a plurality of series of ballot indicating keys, movable blocks between the keys in the same series, and the end blocks of each series having pawls thereon, of the gears 44 with which the pawls engage, each having the projection 75, the catches 77 having the recesses 78, the rack 46 meshing with the gears and an adjustable stop for arresting the rack after a predetermined movement.

32. In a voting machine, the combination with a movable ballot indicator forming a part of the permanent structure, of a counter, a counter-actuator also forming a part of the permanent structure, connections between the indicator and the actuator for placing the latter in operative connection with the counter when the indicator is operated but without operating the counter, and means controlling access to the ballot indicator for positively operating the counter actuator to cause the complete operation of the counter.

33. In a voting machine, the combination with a series of movable ballot indicators forming a part of the permanent structure and interlocking devices between said indicators to prevent the operation of more than a predetermined number, of a series of counters one for each indicator, a series of counter actuators also forming a part of the permanent structure, connections between the indicators and actuators for placing the latter in operative connection with their counters when the indicators are operated but without operating them to actuate the counters and means for positively moving all of the operated actuators simultaneously to cause the movement of the counters controlled thereby.

34. In a voting machine the combination with a register, a pivoted register actuator, of a spring projected ballot indicator normally holding the actuator out of coöperative engagement with its register and adapted when moved against its spring to cause the operative engagement of the actuator with its register and to become engaged with said actuator and thereby locked from operation, and means for operating the actuator to operate the register one number and release the key, permitting it to resume its normal position.

35. In a voting machine the combination with a counter, of an actuator therefor and a key adapted to be operated by a voter to permit the actuator to move automatically into coöperative relation with its counter, said actuator incapable of direct actuation by the voter to move the counter, and means controlling access to the key, and adapted to move the actuator to operate the counter one number and return the parts to original position during a complete cycle of operation of the machine.

36. In a voting machine the combination with a movable ballot indicator, of a counter, a counter actuator restrained by the indicator and capable of automatic movement into a coöperative relation with the counter by the movement of the indicator, but incapable of movement by the indicator to operate the counter, and means for operating the counter and actuator relatively to cause the movement of the former one number only during the complete cycle of movement of the machine.

37. In a voting machine, the combination with a plurality of ballot indicators, of an equal number of counters, counter actuators normally held by the indicators out of engagement with the counters, but upon the movement of the indicators permitted to be moved into coöperative relation with the counters but incapable of movement by the indicators to advance the counters and means for causing the operation of the counters whose indicators have been moved to voted position and returning the indicators and actuators to original position during a complete cycle of operation of the machine.

38. In a voting machine the combination with a plurality of ballot indicators, and interlocking devices to prevent the operation of more than a predetermined number, of an equal number of counters, counter actuators therefor capable of automatic movement into coöperative relation with the counters upon the movement of the indicators but incapable of movement by the indicators to actuate the counters and means for effecting the simultaneous operation of the actuators and the return of the indicators to original position.

39. In a voting machine the combination with a series of tiers, or rows, of voting mechanisms each having its own limiting mechanisms operable by the voting mechanisms thereof, with a bar adjustable independently of but controlling the operation of the limiting mechanisms of said tiers and also operable by the limiting mechanism of one row and means for operating said bar independently of the operation of the voting mechanisms.

40. In a voting machine the combination with the casing a plurality of ballot indicators, and interlocking devices between indicators in the same row, a movable bar or member capable of being moved to an abnormal position and adjustable stops between said member and the interlocking devices, whereby the member when moved will prevent the operation of certain of the indicators.

41. In a voting machine, the combination with tally-mechanisms, of voting-keys having slides provided with cams, locking bolts terminally separable by the cams on the slides, cam-carrying spacers connected with the terminal locking-bolts of the series, said slides being capable of movement sufficient to withdraw their cams from between the separated extremities of the locking-bolts, yielding means for returning the locking-bolts to their normal positions, and locking-blocks mounted for movement transversely to the locking-bolts for terminal separation by said spacer-cams, said spacer-cams being withdrawn from engagement with the blocks by said means for yieldingly actuating the locking-bolts, substantially as specified.

42. In a voting machine, a registering mechanism and a pawl for actuating it for each candidate or ticket arranged in rows or series, and a series of bars, one for each row or series of pawls connected for simultaneous operation, and adapted when moved to actuate every pawl that is in position to actuate the registering mechanisms.

43. In a voting machine, a part operated after voting, a registering mechanism and a pawl for actuating it for each candidate or ticket arranged in rows or series, a series of bars one for each row or series of pawls connected for simultaneous operation and adapted when moved to actuate every pawl that is in position to actuate the registering mechanisms and means actuated by the said part for moving said bars.

44. In a voting machine, a registering mechanism, a movable pawl, a key for controlling the movement of said pawl to a position to actuate the registering mechanisms, independent means for actuating said pawl when in such position, and means actuated by said key for preventing the actuation of the other registering mechanisms.

45. In a voting machine, the combination of registering mechanism, independent locking mechanism and means for actuating the registers and controlling the return of the locking mechanisms to normal position, said means including members movable together in a plane parallel with that of the front of the machine.

46. In a voting machine, a registering mechanism and a pawl for actuating it for each candidate or ticket arranged in rows or series, and a series of bars, one for each row or series of pawls, and adapted when moved to actuate every pawl that is in position to actuate the registering mechanisms.

47. In a voting machine, a part operated after voting, a registering mechanism and a pawl for actuating it for each candidate or ticket arranged in rows or series, a series of bars one for each row or series of pawls and adapted when moved to actuate every pawl that is in position to actuate the registering mechanisms, and means actuated by the said part for moving said bars.

48. In a voting machine, a voting key for each candidate or ticket for controlling the movement of independent parts of the machine into position for actuation, connected parts independently mounted on stationary pivots for simultaneously actuating such parts of the machine and all movable on their pivots in the same direction and means actuated by the keys for preventing the actuation of some of said parts.

49. In a voting machine, the combination of a registering mechanism arranged in rows or series, independent pawls to actuate the same, and a device movable to actuate such of said pawls as have been selected by a voter, said device having attached thereto bars, one for each row or series of pawls, for actuating said selected pawls to operate the selected registering mechanism.

50. In a voting machine, a plurality of keys and counters arranged in parallel rows with a plurality of keys and counters in each row, a longitudinally moving bar for each row of keys and counters, by each of which bars the counters in each row are operated.

51. In a voting machine, the combination of keys or indicators and counters forming a part of the permanent structure, said keys and counters being arranged in a plurality of parallel rows, with a plurality of keys and counters in each row, with a series of bars movable longitudinally parallel to the rows of keys and counters, one bar for each row, said bars serving to operate the counters of their respective rows.

52. In a voting machine, the combination with a plurality of counters and corresponding keys forming part of the permanent structure and movable to voted position without operating the counters, said keys and counters being arranged in a single row, of operating means for the counters comprising a bar movable endwise and actuating the counters whose keys are in voted position.

53. In a voting machine, the combination with a plurality of counters and corresponding keys forming part of the permanent structure and movable to voted position without operating the counters, of operating means for the counters comprising a plurality of bars movable endwise and actuating the counters whose keys are in voted position each of said bars serving to actuate a plurality of counters.

54. In a voting machine, the combination with a plurality of counters and corresponding keys forming part of the permanent structure and movable to voted position without operating their counters, of an operating means for the counters embodying a plurality of bars movable endwise and causing the resetting of the operated keys and the operation of the counters whose keys are in voted position.

55. The combination, in a voting machine, of a counter, an actuator therefor adapted to be operated without operating the counter and positively actuated means for positively returning said actuator and thereby advancing the counter one number, said actuator being incapable of actuating its counter excepting through said actuating means.

56. In a voting machine the combination with a plurality of rows of keys forming part of the permanent structure and counters therefor, of a corresponding plurality of longitudinally-movable bars operable in a direction parallel to the rows of keys and counters upon which movement the operation of the counters is dependent each of said bars serving to actuate a plurality of counters.

57. In a voting machine the combination with a plurality of counters arranged in a row, actuators for said counters forming a part of the permanent structure adapted to be moved to voted position without operating the counters, and incapable of separate operation by the voter to actuate the counters, of a bar moving parallel to the row of counters for advancing one number, all the counters whose actuators are in voted position.

58. In a voting machine, the combination with counters arranged in a plurality of parallel rows, indicators for said counters forming a part of the permanent structure adapted to be moved to voted position without operating them and incapable of separate operation to actuate the counters, of bars one for each row of counters movable longitudinally and parallel with the rows of counters for advancing one number all of said counters whose indicators are in voted position.

59. In a voting machine, the combination with a plurality of counters arranged in a plurality of parallel party rows, indicators for said counters forming a part of the permanent structure adapted to be moved to voted position without operating the counters, of a plurality of bars, one for each party row of counters, movable longitudinally and extending parallel therewith for advancing all of said counters one number whose indicators are in voted position and means operable by the voter after indicating his vote for imparting longitudinal movement to said bars and operating the indicated counters each of said bars serving to actuate a plurality of counters.

60. In a voting machine, registering mechanism independent pawls not in position to actuate said registering mechanisms a common means independently mounted to actuate said pawls when in an actuating position and movable in the same direction and means for preventing the actuation of some of said registering mechanisms.

61. A series of counter actuators capable of being placed in either idle or active position, an operating bar therefor moving lengthwise, capable of moving any or all of said counter actuators that have been placed in active position.

62. A series of counter actuators, an operating bar therefor, capable of moving any or all of said counter actuators, projections on said bar for engaging said counter actuators and moving them with the operation of the bar.

63. A series of counter actuators, an operating bar therefor having projections thereon, said counter actuators being capable of movement to position to be engaged by said projections, and means to move said bar endwise to operate said counter actuators.

64. The combination in a voting machine of counters, actuators therefor, an actuating bar, said bar having a plurality of projections thereon with recesses therebetween said projections being capable of engaging with and moving said actuators, to actuate a plurality of counters.

65. The combination in a voting machine of counters, actuators therefor, an actuating bar, said bar having a plurality of projections thereon with recesses therebetween said projections being capable of engaging with and moving said actuators, to actuate a plurality of counters, said bar with its projections being formed of a single piece of sheet metal.

66. In a voting machine, the combination of a plurality of counters, an operating bar therefor formed of sheet metal bent into a channel and having projections formed thereon.

67. The combination in a voting machine of a counter and a counter actuating bar, a plurality of pivoted counter actuators arranged in line with said bar, said actuators extending across said bar and being moved by said bar to a uniform normal position.

68. A series of counter actuators, an operating bar therefor, capable of moving any or all of said counter actuators, projections on said bar for engaging said counter actuators and moving them with the operation of the bar, said counter actuators being movable to engage with the projections on said bar.

JACOB H. MYERS.

Witnesses:
 GRACE A. RODA,
 GILES WILLARD RICH.